US007346691B2

(12) United States Patent
Peiffer (10) Patent No.: US 7,346,691 B2
(45) Date of Patent: *Mar. 18, 2008

(54) CONNECTION MANAGEMENT SYSTEM AND METHOD

(75) Inventor: Christopher Peiffer, Campbell, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 169 days.

This patent is subject to a terminal disclaimer.

(21) Appl. No.: 11/296,759

(22) Filed: Dec. 7, 2005

(65) Prior Publication Data

US 2006/0089996 A1    Apr. 27, 2006

Related U.S. Application Data (63) Continuation of application No. 09/972,691, filed on Oct. 5, 2001, now Pat. No. 7,007,092.

(60) Provisional application No. 60/239,071, filed on Oct. 5, 2000, provisional application No. 60/308,234, filed on Jul. 26, 2001.

(51) Int. Cl.
*G06F 15/16* (2006.01)
(52) U.S. Cl. ............... 709/227; 709/203; 709/217; 709/223; 709/224; 709/229; 707/7
(58) Field of Classification Search ............ None
See application file for complete search history.

(56) References Cited

U.S. PATENT DOCUMENTS

| 5,826,261 A | 10/1998 | Spencer |
| 5,828,840 A | 10/1998 | Cowan et al. |
| 5,848,246 A | 12/1998 | Gish |
| 5,850,517 A | 12/1998 | Verkler et al. |
| 5,867,661 A | 2/1999 | Bittinger et al. |
| 5,908,469 A | 6/1999 | Botz et al. |
| 5,918,013 A | 6/1999 | Mighdoll et al. |
| 6,029,182 A | 2/2000 | Nehab et al. |
| 6,052,718 A | 4/2000 | Gifford |
| 6,058,428 A | 5/2000 | Wang et al. |
| 6,076,108 A | 6/2000 | Courts et al. |
| 6,078,953 A | 6/2000 | Vaid et al. |
| 6,092,099 A | 7/2000 | Irie et al. |
| 6,098,093 A | 8/2000 | Bayeh et al. |
| 6,128,655 A | 10/2000 | Fields et al. |
| 6,185,598 B1 | 2/2001 | Farber et al. |

(Continued)

OTHER PUBLICATIONS

U.S. Appl. No. 09/974,292, entitled "Agent-Based Event-Driven Web Server Architecture," filed Oct. 9, 2001.

*Primary Examiner*—Yves Dalencourt
(74) *Attorney, Agent, or Firm*—Shumaker & Sieffert, P.A.

(57) ABSTRACT

A system and method for managing connections between a server and a plurality of clients at a network connection management device is provided. The method comprises maintaining at least one connection to the server, receiving requests from the clients, transmitting the requests to the server, receiving responses to the requests from the server, and monitoring a server response time for a selected request sent to the server, the server response time for the selected request being the time elapsed between transmitting the selected request to the server and receiving a corresponding response from the server. A method according to the present invention may also include basing the number of connections to the server on the server response time.

26 Claims, 6 Drawing Sheets

U.S. PATENT DOCUMENTS

| | | |
|---|---|---|
| 6,216,164 B1 | 4/2001 | Zaremba, Jr. |
| 6,247,009 B1 | 6/2001 | Shiiyama et al. |
| 6,266,369 B1 | 7/2001 | Wang et al. |
| 6,269,357 B1 | 7/2001 | Nakayama et al. |
| 6,275,301 B1 | 8/2001 | Bobrow et al. |
| 6,304,676 B1 | 10/2001 | Mathews |
| 6,434,559 B1 | 8/2002 | Lundberg et al. |
| 6,446,028 B1 | 9/2002 | Wang |
| 6,519,636 B2 | 2/2003 | Engel et al. |
| 6,598,167 B2 | 7/2003 | Devine et al. |
| 6,718,390 B1 | 4/2004 | Still et al. |
| 6,725,272 B1 | 4/2004 | Susai et al. |
| 6,771,646 B1 | 8/2004 | Sarkissian et al. |
| 6,834,326 B1 | 12/2004 | Wang et al. |
| 7,007,092 B2 * | 2/2006 | Peiffer ........................ 709/227 |
| 7,007,104 B1 | 2/2006 | Lewis et al. |
| 7,010,573 B1 | 3/2006 | Saulpaugh et al. |
| 2002/0042839 A1 | 4/2002 | Peiffer et al. |
| 2003/0028433 A1 | 2/2003 | Merriman et al. |
| 2003/0037108 A1 | 2/2003 | Peiffer |

* cited by examiner

CONNECTION MANAGEMENT SYSTEM AND METHOD

CROSS REFERENCE TO RELATED APPLICATIONS

This application is a continuation of U.S. patent application Ser. No. 09/972,691, filed Oct. 5, 2001 now U.S. Pat. No. 7,007,092, which claims priority to U.S. Provisional Application Ser. No. 60/239,071, filed Oct. 5, 2000 and U.S. Provisional Application Ser. No. 60/308,234, filed Jul. 26, 2001, the entire contents of which are incorporated herein by reference.

TECHNICAL FIELD

The present invention relates to a system and method for managing connections between a server and a plurality of clients on a computer network. More particularly, the invention provides a system and method for adapting a number of connections between a connection management device and a server.

BACKGROUND OF INVENTION

The Internet has experienced explosive growth in recent years. The emergence of the World Wide Web has enabled millions of users around the world to easily download web pages containing text, graphics, video and sound data while at home, at work or from remote locations via wireless devices. Popular web sites may experience many thousands of visitors and requests for content each day. Such a large volume of use, however, may slow down the response time of the servers that host a popular web site, possibly causing users to abandon the requested web page and move on to another web page. This may result in lost revenue and exposure for many commercial web sites.

Many factors may contribute to the slowing of a busy server. For example, some general purpose servers, such as most UNIX-based or Microsoft WINDOWS NT-based systems, start a new process or spin a new thread from a process for each connection received. Each process or thread may be computationally expensive, requiring a large amount of processor time and memory just to launch. Therefore, during busy periods when hundreds of requests for data may be arriving simultaneously at the server, a significant amount of the server's resources may be devoted merely to launching new processes or threads, rather than to serving web resources to clients. This may slow server performance significantly.

Other operating system implementations for general purpose servers have adopted a scheduling model, in which the operating system restricts its resources to a single process at any given time. However, these implementations require the operating system scheduler to continuously poll its complete list of responsibilities in order to determine whether any of them require resource allocation. Thus, the more users that are connected to the server, the longer the list of tasks that it must poll, and the longer the polling procedure takes. This may slow the web server's ability to connect or service end users.

Several other factors may also contribute to the slowing of web servers. For example, some versions of the Transmission Control Protocol (TCP), a protocol that is typically used to control connections between a web server and a web client, include a feature known as "slow start." Slow start is a mechanism built into TCP that is used to gauge the transmission capacity of a new connection. Whenever a new connection is established, TCP initially fulfills requests over the connection at a slow rate. The rate of transmission is then gradually increased until an optimal flow rate is achieved. For short transmissions, however, the optimal flow rate may not be attained by the time all of the data has been sent, thus slowing overall server performance.

Some versions of the Hypertext Transfer Protocol (HTTP), a protocol used to transfer web page data over a TCP connection, are able to maintain persistent connections between a client and a server. Persistent connections allow multiple requests to be sent to a server from a client via a single connection, and thus may allow the benefits of the slow start mechanism to be realized to a greater degree. However, a server that maintains persistent connections must typically manage a much larger number of open connections. This may significantly slow down server performance. Thus, many high-traffic web sites either disable persistent connections, or set a low timeout value for the connections, which effectively disables the technology.

Therefore, there remains a need for a web server connection management system capable of handling a large number of connections between a server and clients without suffering from slow response times.

SUMMARY OF INVENTION

The present invention provides a system and method for managing connections between a server and a plurality of clients at a connection management device, the connection management device being interposed between the server and the plurality of clients on a computer network. The method comprises maintaining at least one connection to the server, receiving requests from the clients, transmitting the requests to the server, receiving responses to the requests from the server, and monitoring a server response time for a selected request sent to the server, the server response time for the selected request being the time elapsed between transmitting the selected request to the server and receiving a corresponding response from the server. A method according to the present invention may also include basing the number of connections to the server on the server response time.

DETAILED DESCRIPTION OF THE PREFERRED EMBODIMENTS

Figure 1:
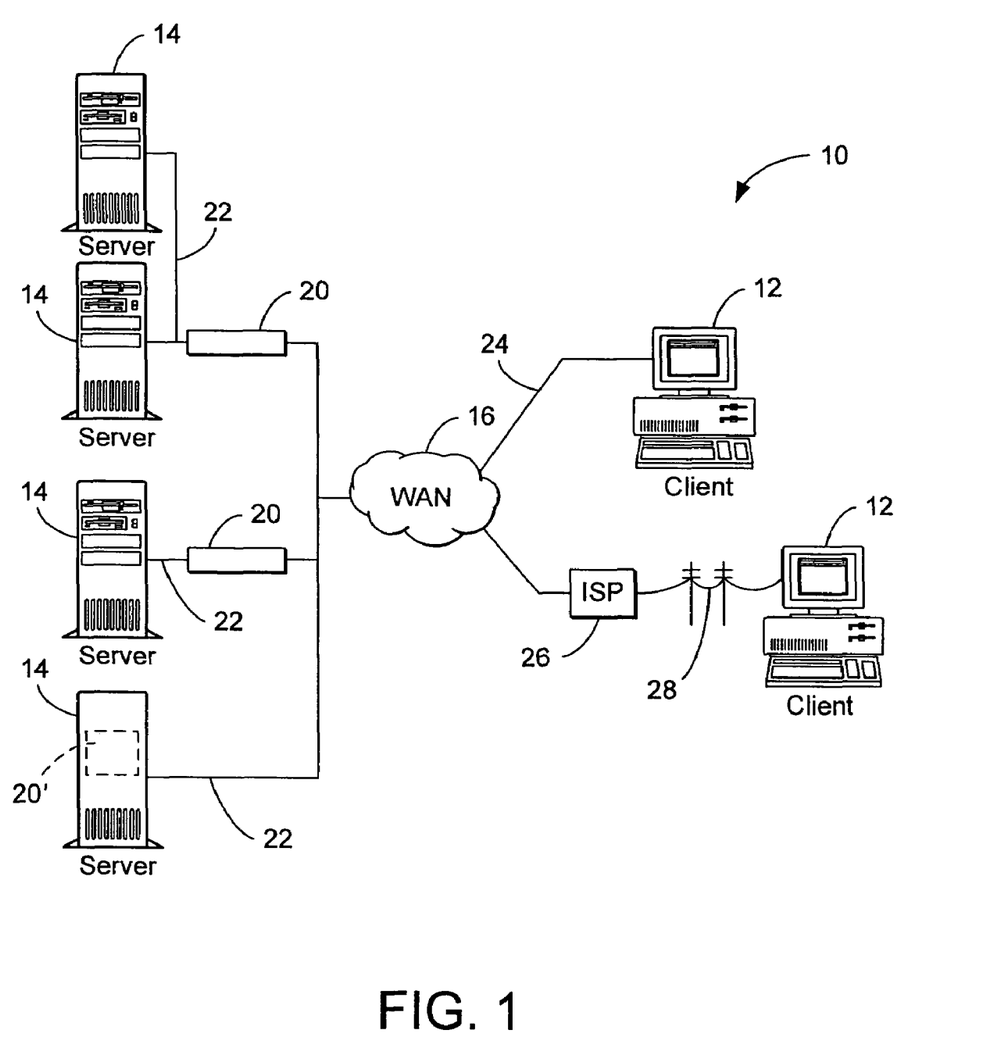
FIG. 1 is a schematic view of an exemplary computer network on which a first embodiment of a system for managing connections between a server and a client according to the present invention is implemented.

Referring initially to FIG. 1, a computer networking system according to one embodiment of the present invention is shown generally at 10. Networking system 10 typically includes a plurality of clients 12 configured to download data from server computers 14 via computer network 16. Clients 12 may be any suitable type of computing device, such as personal computers (PCs), portable data assistants (PDAs), web-enabled wireless telephones, mainframe computers, etc.

Servers 14 typically are web servers configured to serve a web resource to browser programs executed on clients 12. Exemplary browser programs include the NETSCAPE browser commercially available from the Netscape Communications Corporation of Santa Clara, Calif. and the INTERNET EXPLORER browser commercially available from the Microsoft Corporation of Redmond, Wash. The web servers and browsers typically communicate using HTTP. The web resource may include any desired type of data, for example web page source data, image data, sound data, video data, graphics data, embedded code such as a JavaScript applet, a style sheet, or virtually any other resource accessible and interpretable by a browser via a Uniform Resource Indicator (URI).

Networking system 10 further includes a connection management device 20 positioned intermediate each of clients 12 and server computers 14. Each connection management device 20 is configured to receive requests for web resources from clients 12, forward the requests to servers 14, receive responses to the requests from servers 14, and forward the responses back to clients 16.

Typically, connection management devices 20 are stand-alone appliances linked to computer network 16. According to an alternative embodiment of the invention, networking system 10 may include a connection management device 20' integrated into a server 14'. Furthermore, each connection management device 20 may be connected to a single server 14, or may be connected to multiple servers, as shown. When one connection management device 20 is linked to several servers 14, it functions to distribute requests from remote clients 12 to the many servers 14, thereby approximately balancing the load placed on each of the servers.

Typically, connection management devices 20 are connected to servers 14 via Local Area Networks (LANs) 22, and are connected to remote clients 12 via computer network 16, which is typically a Wide Area Network (WAN) such as the Internet. Clients 12 may be connected to WAN 16 directly via a broadband connection 24, or via an Internet Service Provider (ISP) 26. Typically, client 12 and ISP 26 are linked via a modem connection through the Public Switched Telephone Network (PSTN) 28. A typical operating speed for the PSTN modem connection 26 is approximately 56K bits per second (bps) or less, while a typical operating speed for broadband connection 24 is between about 256K bps to 10 Megabits per second, and may be higher.

Figure 2:
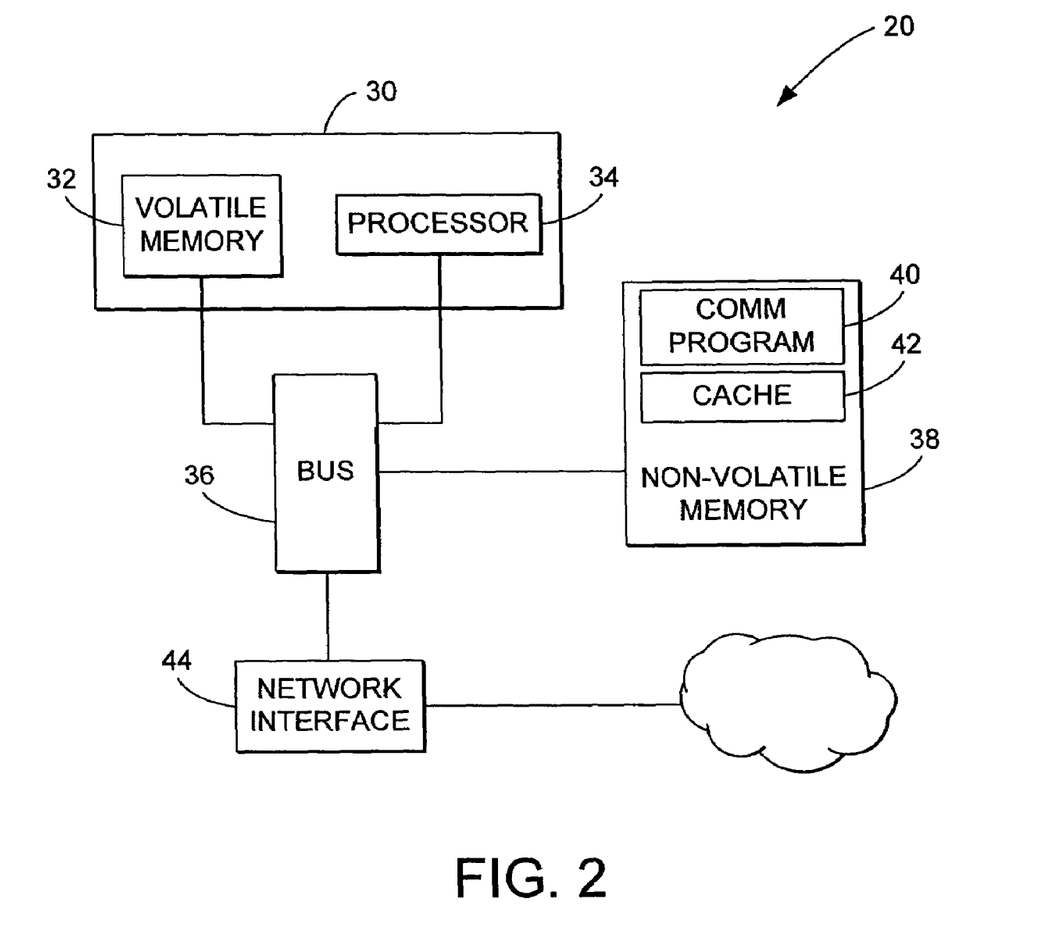
FIG. 2 is block diagram of a connection management device of the embodiment of FIG. 1.

FIG. 2 shows connection management device 20 in more detail. Connection management device 20 includes a controller 30 having volatile memory 32 and a processor 34 linked by a bus 36. Connection management device 20 also typically includes non-volatile memory 38 having a communications program 40 stored therein. Non-volatile memory 38 may also be configured to include a cache 42. Communications program 40 is configured to manage connections to clients 12 and servers 14 according to the methods shown in FIGS. 6-8 and described below. Cache 42 is configured to store web resources, such as web page source data, filtered web page source data and image data previously requested by and sent to remote clients 12.

Connection management device 20 also typically includes a network interface 44 coupled to bus 36 and to an external network connection to network 16. Network interface 44 is configured to enable connection management device 20 to send and receive data via computer network 16. An example of a suitable network interface is the Intel Ethernet Pro 100 network card, commercially available from the Intel Corporation of Santa Clara, Calif.

The connection management device may also have other features described more fully with reference to the network devices and acceleration devices disclosed in co-pending U.S. patent applications Ser. Nos. 09/680,675, 09/680,997, and 09/680,998, filed Oct. 6, 2000, Nos. 60/239,552 and 60/239,071, filed Oct. 10, 2000, No. 60/287,188, filed Apr. 27, 2001, No. 60/308,234 filed Jul. 26, 2001, No. 60/313,006, filed Aug. 16, 2001, and No. 09/882,375, filed Jun. 15, 2001, the disclosures of each of which are herein incorporated by reference.

Connection management device 20, via communications program 40, is configured to manage the connections between servers 14 and clients 12 to optimize the flow of requests and responses between the servers and the clients. Connection management device 20 typically accomplishes this by maintaining a selected number of open connections to server 14, over which it pipelines and multiplexes requests from a larger number of clients, as described in U.S. Provisional Patent Application Ser. No. 60/308,234. Connection management device 20 also adapts the number of connections to the server to compensate for changes in client connection and/or request load, as described below.

When requesting a web resource on system 10, clients 12 connect to connection management device 20, rather than to the server 14 that hosts the requested web resource. TCP protocols regarding such functions as opening and closing connections or error checking are handled by connection management device 20, rather than by server 14, thus saving server resources. After receiving the request, connection management device 20 forwards the request to server 14 via a selected connection, as explained in more detail below. Once connection management device 20 receives a response to the request from server 12, the connection management device forwards the response to client 12.

The connections between connection management device 20 and server 14 are typically persistent connections. This allows problems associated with the TCP slow start feature to be avoided, as a connection between connection management device 20 and server 14 over which a small web object is transmitted remains open after transmission is complete. Thus, the next response sent over the same connection will be sent at the optimal speed that was determined when the persistent connection was first made.

The rate of new connections being made by clients 12 to connection management device 20, as well as the rate of client requests arriving at the connection management device, may vary over time. This may affect the server response time (the time that elapses between the connection management device sending a request to the server and receiving a corresponding response from the server) in the absence of some sort of compensation mechanism. For example, during periods of heavy use, the number of connections between connection management device 20 and server 14 may not be adequate to ensure fast server response time. Likewise, during periods of light use, connection management device 20 may be able to forward client requests to server 14 at an acceptable rate even with fewer connections open between itself and the server.

Figure 3:
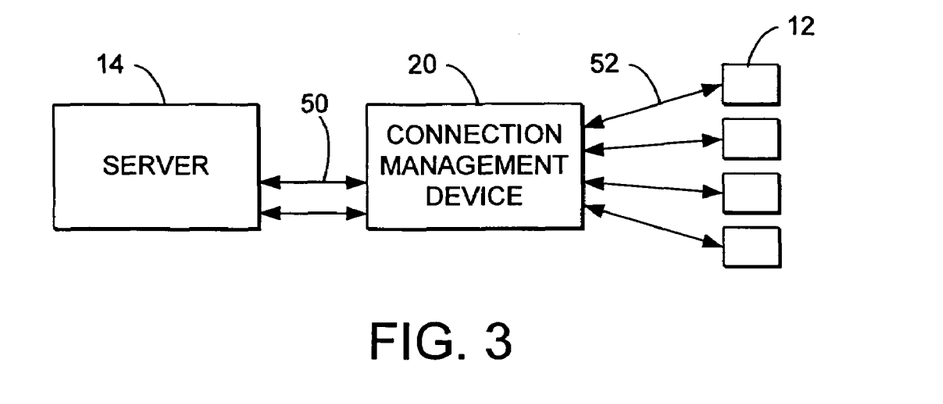
FIG. 3 is a schematic diagram of a number of connections between the connection management device of FIG. 2 and a server at a first, moderate rate of client connections.

To compensate for changes in client traffic, connection management device 20 may be configured to adapt or vary the number of connections maintained with server 14. This is illustrated, in a greatly simplified manner, in FIGS. 3-5. First, as shown in FIG. 3, connection management device 20 will ordinarily maintain a number of connections 50 to server 14 during periods of moderate client traffic. Two connections 50 are shown for exemplary purposes, but the actual number of connections 50 will typically be much larger. Similarly, four connections 52 to clients 12 are shown, but the actual number will typically be much larger, on the order of hundreds or even thousands of connections.

Figure 4:
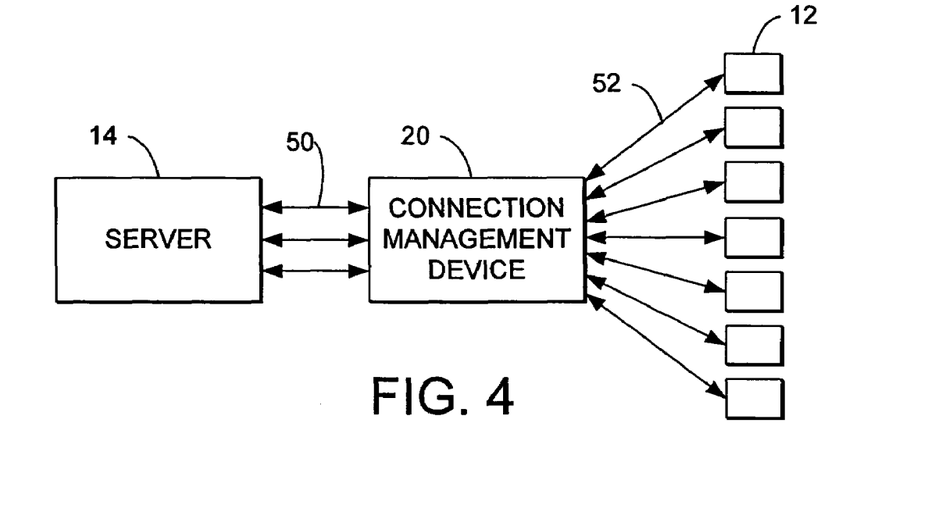
FIG. 4 is a schematic diagram of a number of connections between the connection management device of FIG. 2 and a server at a second, higher rate of client connections.
Figure 5:
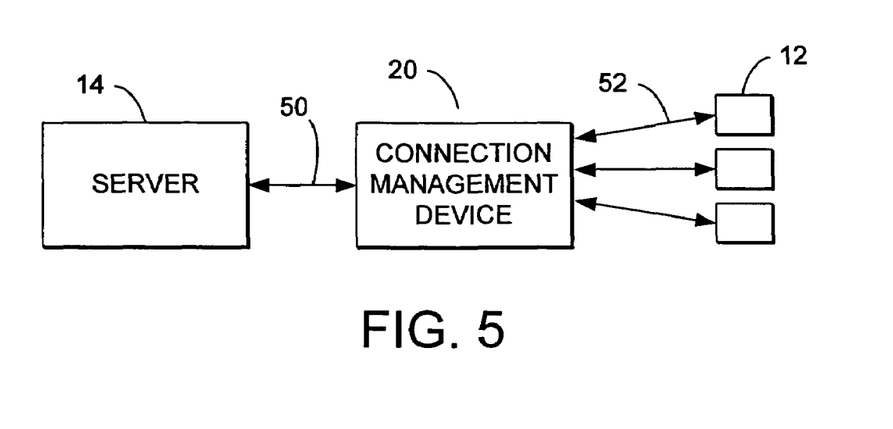
FIG. 5 is a schematic diagram of a number of connections between the connection management device of FIG. 2 and a server at a third, lower rate of client connections.

Next, as shown in FIG. 4, during periods of heavy use, connection management device 20 may open additional connections to server 14 to allow the additional requests to be quickly serviced by the server. One additional connection 50 to server 14 is shown relative to FIG. 3, but any number of new connections may be opened. Likewise, as shown in FIG. 5, during periods of light use, connection management device 20 may be configured to close a connection between itself and server 14, reducing the amount of server resources consumed by servicing connections. In this manner, the adaptive connection management capabilities of connection management device 14 help to speed up server response times for requests, while at the same time reducing the burden on server 14 of maintaining a large number of client connections.

Figure 6:
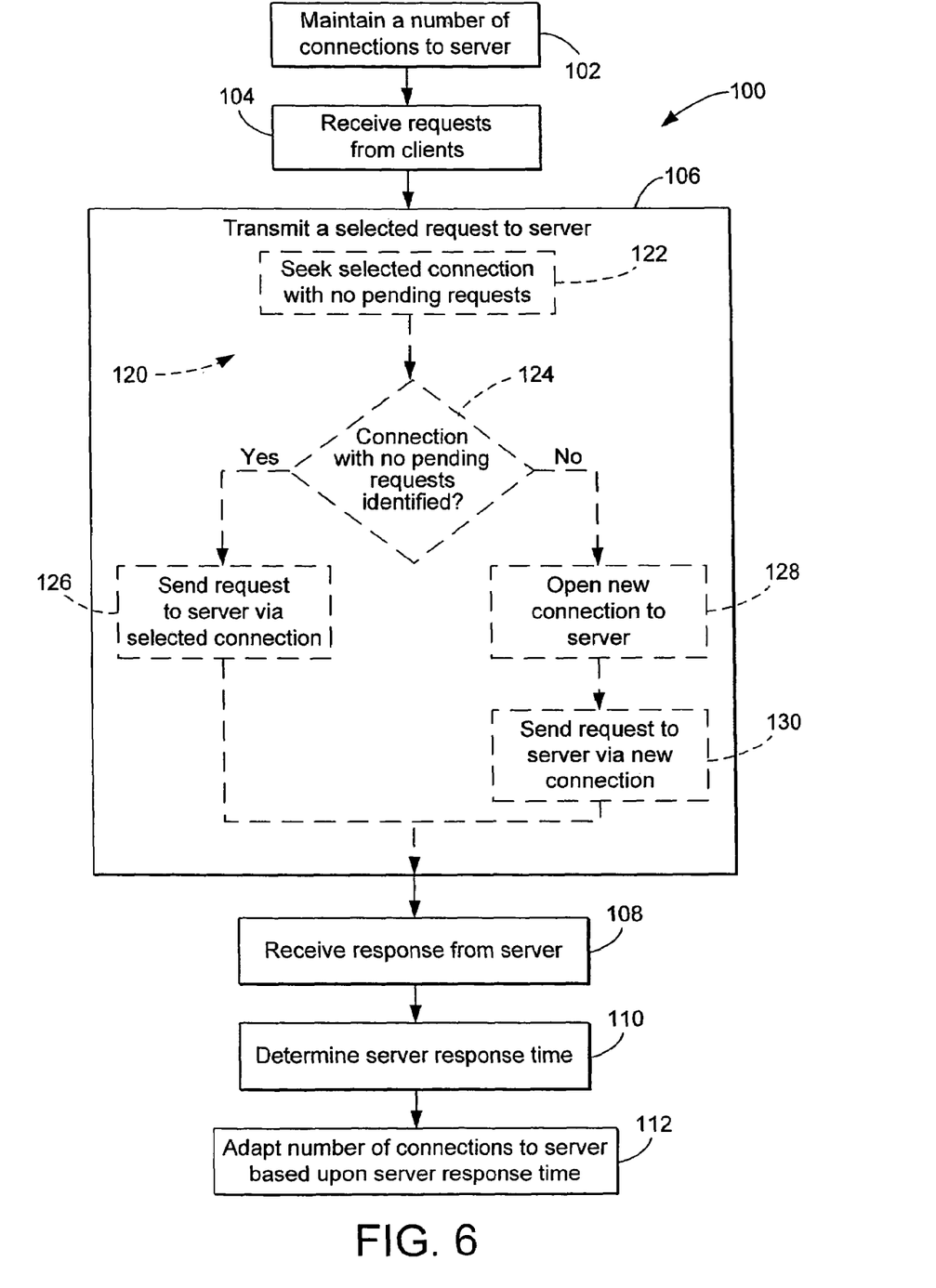
FIG. 6 is a flow diagram of a first embodiment of a method of managing network connections according to the present invention.
Figure 7:
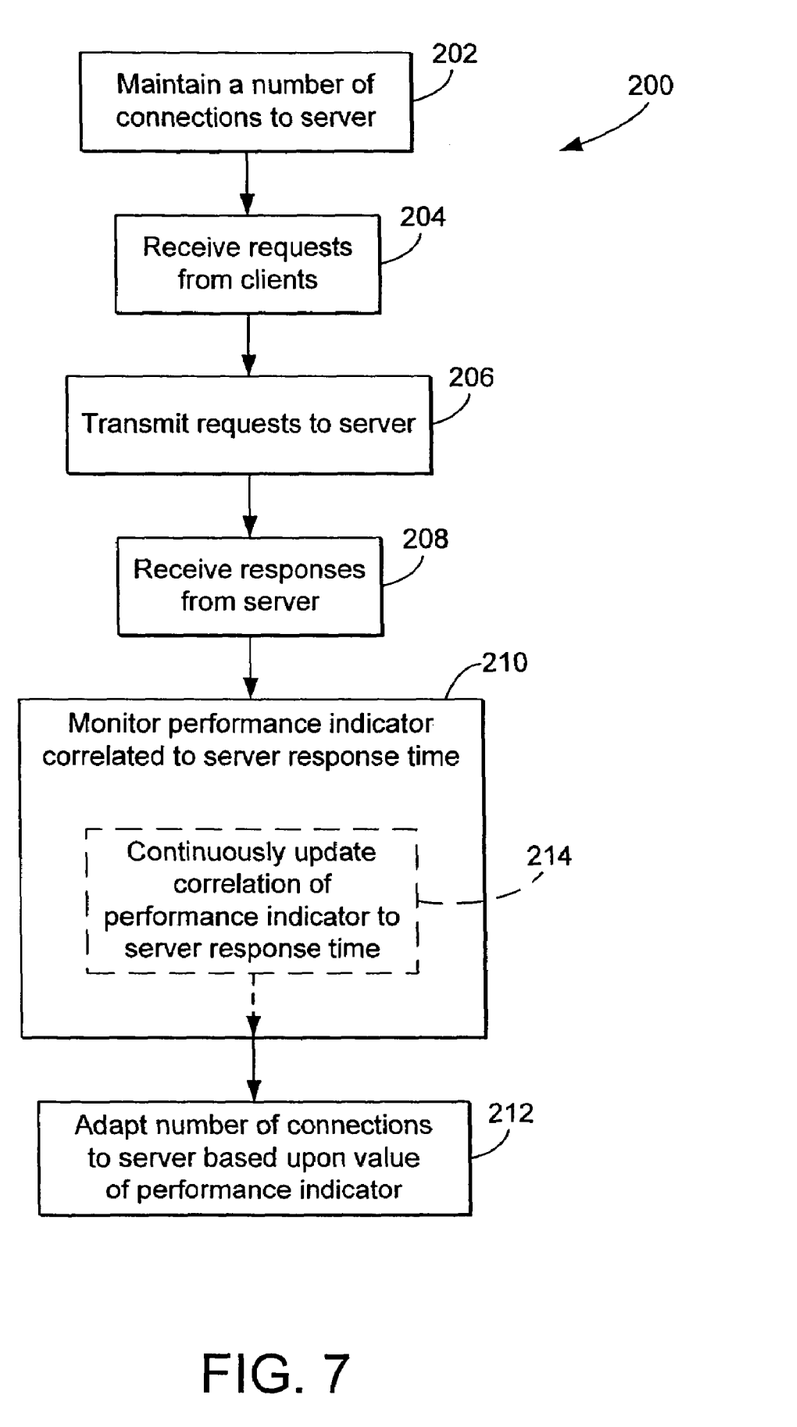
FIG. 7 is a flow diagram of a second embodiment of a method of managing network connections according to the present invention.
Figure 8:
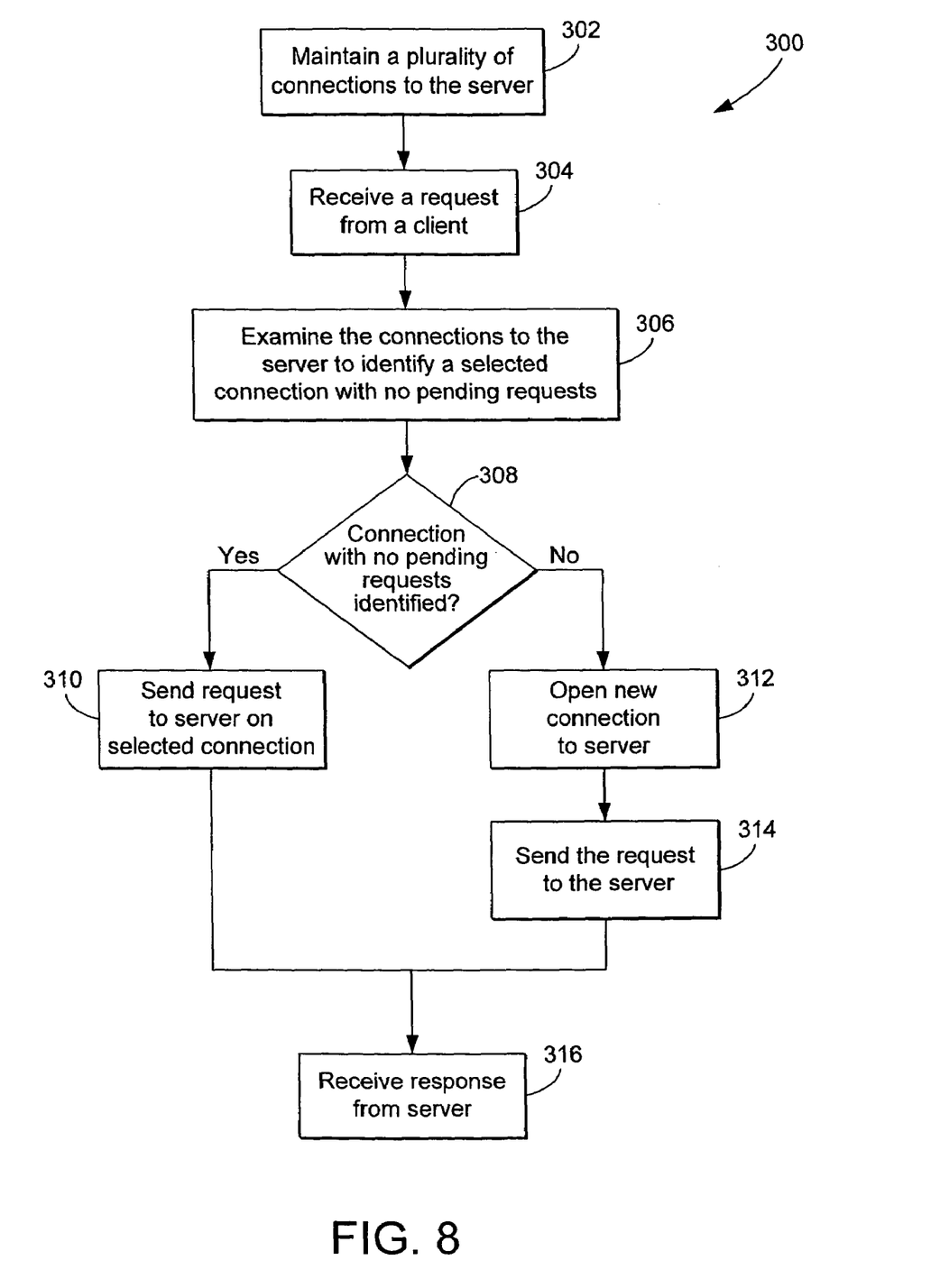
FIG. 8 is a flow diagram of a third embodiment of a method of managing network connections according to the present invention.

Connection management device 20 may monitor server performance and adapt the number of connections 50 to the server in any suitable manner. Exemplary methods are shown in FIGS. 6-8. First, referring to FIG. 6, a first embodiment of a method for adapting the number of connections between connection management device 20 and server 14 is shown generally at 100. The steps shown in FIG. 6 are typically performed by connection management device 20. Thus, machine-readable instructions executable by communications program 40 to perform the steps of method 100 are typically stored on a storage medium within connection management device 20, although they may also be stored on an external storage medium, such as a CD-ROM or floppy disk, another computer, or on a plurality of internal and/or external storage media.

Method 100 initially includes maintaining a number of connections to server 14 at 102, and receiving requests from clients 12 at 104. After requests are received at 104, each request is then transmitted to server 14 at 106 over a selected connection 50. A connection 50 over which a request is sent may be selected based upon any desired criteria. Some exemplary connection selection schemes are described in more detail below. While the step of transmitting requests to server 14 at 106 is described in terms of a selected request, it will be appreciated that the method will typically be applied to all requests transmitted to the server.

After transmitting the selected request to server 14 at 106, method 100 includes receiving a corresponding response from the server at 108, and then determining a server response time at 110. The server response time may be determined in virtually any desired manner. For example, connection management device 20 typically stores information about each request forwarded to server 14 to allow the identification of the corresponding response from the server. Thus, when connection management device 20 receives a response to a selected request, at 108, the connection management device may determine the server response time after the request is received by first determining when the request was sent, and then determining the time elapsed between sending and receiving the request. Alternatively, connection management device 20 may actively keep track of how long each request is pending, rather than calculating it after receiving the response.

After determining the server response time at 110, method 100 includes adapting the number of connections 50 to server 14 based upon the determined server response time. Adapting the number of connections 50 to server 14 may include either closing a connection 50 to the server when the server response time is sufficiently low, and/or opening a new connection 50 to the server when the server response time is unacceptably high.

Any suitable method may be used to determine when to open or close a connection 50. For example, the server response time for each request sent from connection management device 20 may be compared to a predetermined response range of times. If any of the determined server response times fall above the predetermined range of times, then a new connection 50 to the server may be opened. Likewise, if any of the server response times fall below the predetermined range of times, a connection 50 to the server may be closed. Alternatively, instead of comparing each individual determined server response time individually to the predetermined time limit, an average of server response times can be continuously calculated over a discrete window of time, and then compared to the predetermined time limit.

Similarly, the predetermined time limit to which the server response time is compared may be determined in any suitable manner. For example, the predetermined time limit may include upper and lower threshold times that may be set by input from a user, or that may be factory-set and unalterable. Furthermore, the predetermined time limit may be continuously updated by communications program 40 based upon any number of variables, such as server response times, the rate at which new client connections are being made to connection management device 20, the rate at which requests are arriving at connection management device 20, the types of resources being requested, the bandwidth of the clients 12 connected to connection management device 20, etc. This may allow somewhat longer response times to be tolerated during periods of high traffic. Any suitable method of updating the predetermined range of server response times may be used. Examples include heuristic methods commonly used to optimize multivariable problems.

Referring again to step 106 in FIG. 6, one example of a suitable method of selecting a connection on which to send a request to server 14 is shown in dashed lines generally at 120. Method 120 includes first seeking a connection to server 14 that has no pending requests at 122. In a server that utilizes a multi-threaded model, each connection is handled by a separate thread. In this situation, multiple requests on a single connection will be serviced in serial. Thus, if a request is pending on a connection, a new request on the same connection will not be serviced until the response to the pending request is sent. This can significantly slow down server response times for new requests. In contrast, multiple requests sent to server 14 via different connections are processed in parallel. Thus, no requests are queued to await others being processed, and the requests are processed more quickly. For this reason, it is preferable to send a new request over a connection with no pending requests.

Connection management device 20 may be configured to seek a connection with no pending requests at 122 in any desired manner. For example, connection management device 20 may poll all connections to server 14 to identify a free connection. Likewise, connection management device 20 may continuously keep track of the connection on which each forwarded request is sent, and also to keep track of whether a reply has been received. In this manner, the status of each connection may be stored and continuously updated in a table, and a connection with no pending request may be identified simply by consulting the table.

If a selected connection with no pending request is identified at 124, then the selected request is sent to server 14 over the selected connection at 126. If, however, a connection with no pending request is not identified at 124, then connection management device 20 may open a new connection to server 14 at 128, and then send the selected request to the server via the new connection at 130. The new connection may remain open for any desired time. For example, the new connection may remain open until the seeking step at 122 reveals multiple connections with no pending requests.

FIG. 7 shows generally at 200 a second embodiment of a method of managing connections according to the present invention. Like method 100, method 200 includes the initial steps of maintaining a number of connections to server 14 at 202, receiving requests from clients 12 at 204, transmitting the requests to the server at 206 and receiving responses to the requests at 208. However, instead of determining the server response times for the requests and basing the number of connections to server 14 on the server response times, method 200 includes monitoring a performance indicator correlated to the server response time at 210, and then adapting the number of connections to the server based upon the value of the performance indicator at 212.

The performance indicator on which the number of connections to server 14 is based may be virtually any quantity that affects the server response time and that can be correlated to the server response time. For example, the rate of requests being received by connection management device 20 and forwarded to server 14 may affect the server response time, and thus may serve as a performance indicator. Correlating the server response time to the rate of requests received may, in this case, include periodically comparing the server response times to the rates of received requests to determine a range of rates of requests received that correlates to a predetermined server response time range, and storing the compared values. Then, adapting the number of connections to the server may include comparing the current rate of requests being received to the determined range, and then opening or closing connections if the current rate is either above or below the determined range, respectively.

Furthermore, historical averages of rates of requests received for selected server response times (or of server response times for selected rates of requests received) may be generated and maintained for comparison. Additionally, the correlation of the performance indicator to the server response time may be continuously updated, as indicated at 214. For example, rather than averaging all historical values of a selected performance indicator for a selected server response time over the entire history of server use, values of the performance indicator over a discrete, recent period of time may be averaged for the selected server response time.

Many different quantities may be used as a performance indicator. For example, besides the rate at which requests are received at connection management device 20, other suitable performance indicators include a rate of formation of new client connections to the connection management device, a type of request received, a client type, a URL requested, client bandwidth (individual client, or total bandwidth of all clients currently connected) and a resource type requested. Each of these performance indicators may be correlated to a desired range of server response times, so that a range of performance indicators correlating to the desired range of server response times may be determined. Furthermore, more than one performance indicator may be monitored by connection management device 20 for adapting the number of connections to server 14. In such a situation, an optimization algorithm, such as a heuristic method suitable for optimizing multivariable problems, may be used to determine a desired number of connections for a selected set of values of multiple performance indicators.

FIG. 8 shows generally at 300 a third embodiment of a method for managing connections according to the present invention. As with methods 100 and 200, method 300 is typically performed by connection management device 20, and includes the initial steps of maintaining a plurality of connections to server 14 at 302 and receiving a request from a client 12 at 304. However, unlike methods 100 and 200, method 300 does not include comparing the server response time or a performance indicator to a predetermined range of values to determine whether to open or close a connection to server 14. Instead, after receiving the request from client 12, the connections to server 14 are examined at 306 to identify a selected connection with no pending requests at 308, as described above for steps 122 and 124 of sub-method 120 of FIG. 6.

If a selected connection with no pending requests is found at 308, then the request is sent to the server on the selected connection at 310. If, however, a connection with no pending requests cannot be found, then a new connection to server 14 is opened at 312, and then the request is sent to the server on the new connection at 314. After sending the request to server 14 at 310 or 314, the response is received from the server at 316. Each of these steps may be performed in the same manner or manners as the corresponding steps described above for method 120, and thus will not be discussed in more detail for reasons of brevity.

While the present invention has been particularly shown and described with reference to the foregoing preferred embodiments, those skilled in the art will understand that many variations may be made therein without departing from the spirit and scope of the invention as defined in the following claims. The description of the invention should be understood to include all novel and non-obvious combinations of elements described herein, and claims may be presented in this or a later application to any novel and non-obvious combination of these elements. Where the claims recite "a" or "a first" element or the equivalent thereof, such claims should be understood to include incorporation of one or more such elements, neither requiring nor excluding two or more such elements.

The invention claimed is:

1. A method of managing connections between a plurality of server and a plurality of clients at a connection management device, the connection management device being interposed between the server and the plurality of clients on a computer network, the method comprising:

maintaining one or more persistent connections from the connection management device to each of the servers;

distributing requests from the clients to the servers over the persistent connections;

monitoring server response times for the requests sent to the servers over the persistent connections; and changing with the connection management device the number of persistent connections from the connection management device to the servers based on the monitored server response times.

2. The method of claim 1, wherein changing with the connection management device the number of connections comprises closing with the connection management device one or more of the connections when the server response time is below a first predetermined threshold.

3. The method of claim 1, further comprising seeking a selected connection with no pending requests before transmitting a received request to the server via the selected connection.

4. The method of claim 3, further comprising opening a new connection for transmission of the received request if no connection with no pending request is found.

5. The method of claim 1, wherein monitoring the server response time includes monitoring a performance indicator that is correlated to the server response time.

6. The method of claim 5, the performance indicator having a value, wherein changing with the connection management device the number of connections comprises changing the number of connections to the server if the value of the performance indicator falls outside a determined range of values.

7. The method of claim 6, further comprising continuously updating the determined range of values by periodically correlating the server response time to the performance indicator.

8. The method of claim 5, wherein the performance indicator is selected from the group consisting of a rate of formation of new client connections to the connection management device, a rate of client requests received, a type of request received, a client type, a client bandwidth, a resource URL, and a resource type requested.

9. A method of optimizing communication between a plurality of clients and a server at a connection management device, the connection management device being configured to connect to the clients and to the server to facilitate resource transfer between the clients and the server, the method comprising:
maintaining one or more persistent connections from the connection management device to the server;
monitoring a server response time for requests sent to the server for each of the persistent connections; and
dynamically decreasing the number of persistent connections from the connection management device to the server when the monitored server response time for one or more of the persistent connections falls below a threshold.

10. The method of claim 9, further comprising opening a new connection to the server and sending the request to the server on the new connection if a connection with no pending requests cannot be identified.

11. The method of claim 9, wherein the connections are persistent connections and a server response time elapses between sending the request to the server and receiving a corresponding response from the server, further comprising monitoring the server response time and changing the number of persistent connections to the server if the server response time falls outside of a predetermined range of times defined at least in part by the threshold.

12. The method of claim 11, wherein decreasing the connections comprises closing one or more of the connections if the server response time is faster than the predetermined range of times.

13. The method of claim 11, wherein a connection is opened if the server response time is slower than the predetermined range of times.

14. The method of claim 9, wherein a server response time elapses between sending the request to the server and receiving a corresponding response from the server, further comprising continuously monitoring a performance indicator correlated to the server response time.

15. The method of claim 14, the performance indicator having a value, further comprising changing the number of connections to the server if the value of the performance indicator falls outside a desired value range.

16. The method of claim 15, wherein the performance indicator is selected from the group consisting of a rate of formation of new client connections to the connection management device, a rate of client requests received, a type of request received, a client type, a client bandwidth, a resource URL, and a resource type requested.

17. The method of claim 15, further comprising continuously updating the desired value range by periodically correlating the server response time to selected values of the performance indicator.

18. The method of claim 17, wherein periodically correlating the server response time to selected values of the performance indicator includes calculating a historical average of server response times for selected values of the performance indicator.

19. The method of claim 9, the connection management device being configured to receive a plurality of requests from the clients and forward the plurality of requests to the server, wherein sending the request to the server includes storing information regarding the request to help identify a corresponding response from the server.

20. A connection management device configured to manage connections between at least one client and a server, the connection management device including a controller having a processor and volatile memory, a network interface configured to interface the connection management device to the computer network, and non-volatile memory, the non-volatile memory containing a communications program executable by the controller to:
maintain one or more persistent connections from the connection management device to the server;
monitor a server response time for requests sent to the server for each of the persistent connections; and
decrease the number of persistent connections from the connection management device to the server when the server response time is shorter than a predetermined range of response times.

21. The connection management device of claim 20, wherein the communications program is executable by the controller to periodically monitor a plurality of server response times for a plurality of requests.

22. The connection management device of claim 20, wherein the communications program is executable by the controller to increase the number of connections to the server when a selected server response time is longer than a predetermined range of response times.

23. The connection management device of claim 22, wherein the communications program is executable by the controller to correlate a performance indicator to the server response times.

24. The connection management device of claim 23, the performance indicator having a value, wherein the communications program is executable by the controller to base the number of connections to the server upon the value of the performance indicator.

25. The connection management device of claim 23, wherein the performance indicator is selected from the group consisting of a rate of formation of new client connections to the connection management device, a rate of client requests received, a type of request received, a client type, a client bandwidth, a resource URL, and a type of resource requested.

26. The connection management device of claim 23, wherein the communications program is executable by the controller to continuously update the correlation of the performance indicator to the server response times.

* * * * *